Feb. 17, 1948.   R. HASTINGS, JR   2,436,358
INDUSTRIAL PLATFORM
Filed Feb. 1, 1944   2 Sheets-Sheet 1
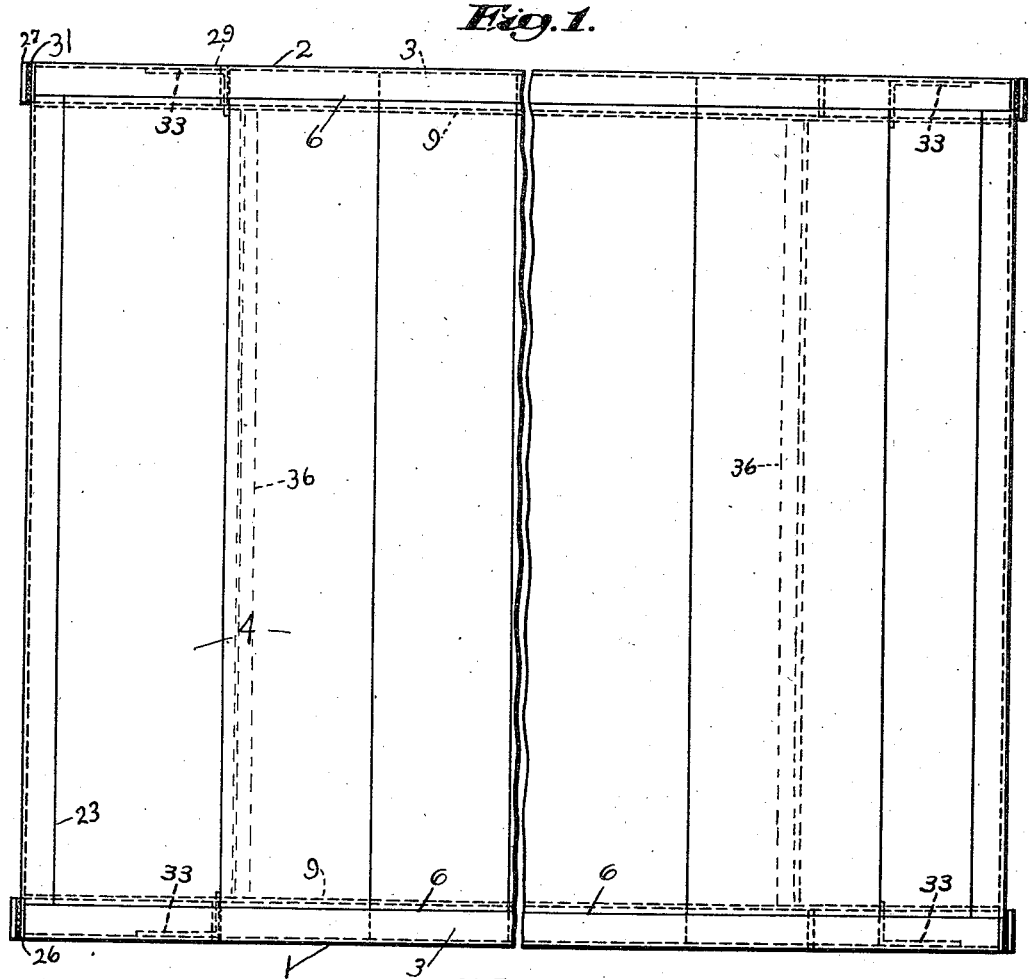
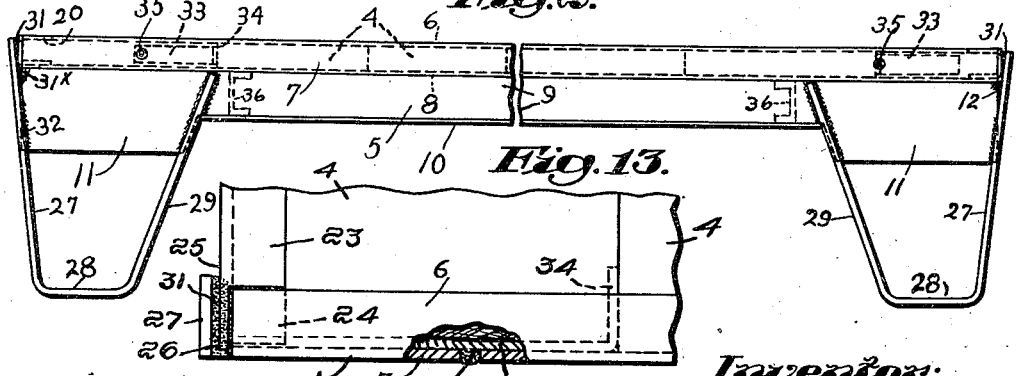
Inventor:
Russell Hastings, Jr.
By Heard Smith & Tennant
Attorneys Feb. 17, 1948.  R. HASTINGS, JR  2,436,358
INDUSTRIAL PLATFORM
Filed Feb. 1, 1944  2 Sheets-Sheet 2
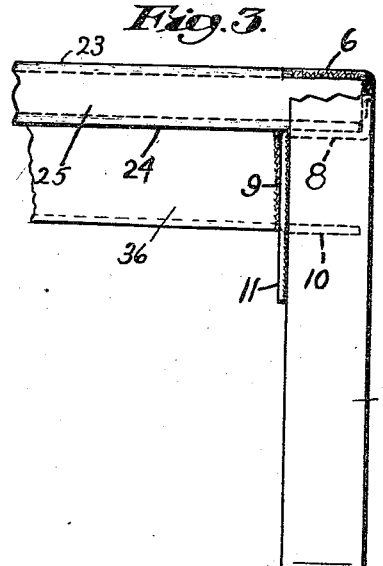
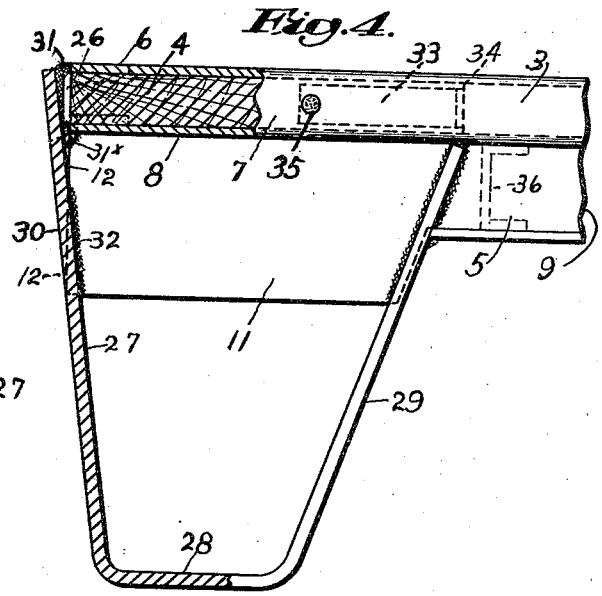
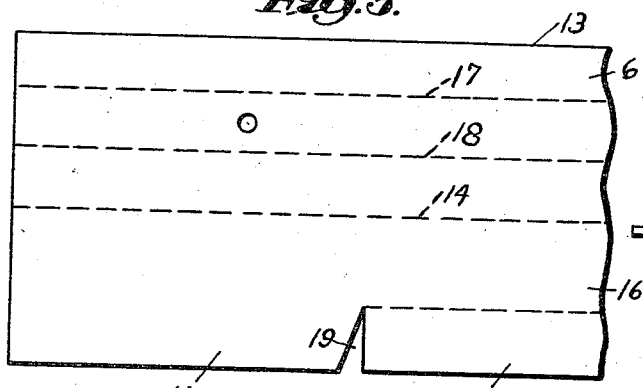
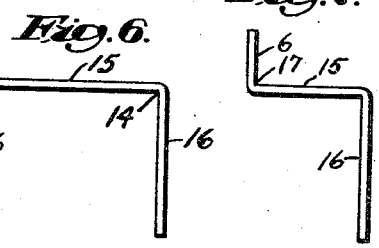
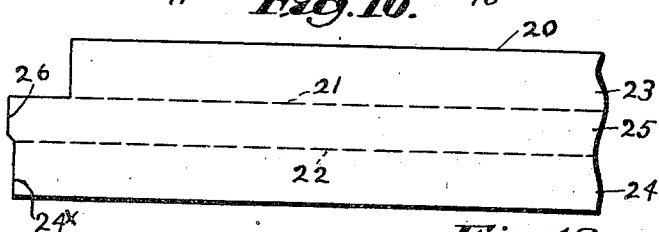
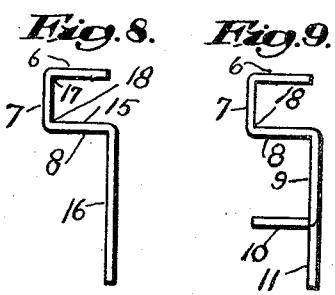
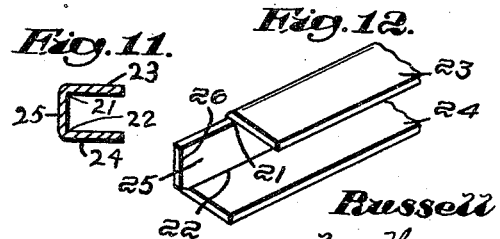
Inventor:
Russell Hastings, Jr.
by Heard Smith & Tennant
Attorneys Patented Feb. 17, 1948

2,436,358

UNITED STATES PATENT OFFICE 2,436,358

INDUSTRIAL PLATFORM

Russell Hastings, Jr., Wellesley, Mass., assignor to Lewis-Shepard Company, Watertown, Mass., a corporation of Massachusetts Application February 1, 1944, Serial No. 520,639

7 Claims. (Cl. 248—120)

This invention relates to improvements in portable platforms or skids generally known as "industrial platforms" which are adapted to be transported in loaded and unloaded condition by elevating trucks adapted to be inserted beneath the platform or skid and the load supporting means of the truck then elevated to raise the platform or skid from the floor and enable it to be transported to a suitable destination and thereupon by lowering the load supporting means to be deposited at said destination. Platforms or skids of this type are subjected to rough usage when in use, and have usually comprised heavy metal frames to withstand such hard usage. Considerable effort is required to lift and stack the platforms when not in use. One of the objects of the invention is to provide a portable platform having reinforced side frames and legs which may be made of lighter material and of such rigidity as to withstand the rough usage to which it is subjected and which can be more easily stacked.

Another object of the invention is to provide a platform construction which can be safely supported upon one end thereby economizing floor space.

Another object of the invention is to provide an all-steel portable platform which can be more economically manufactured and assembled than heretofore.

Another object of the invention is to provide improved means for guiding the elevating truck beneath the platform when introduced in angular relation to the longitudinal axis of the platform.

A further object of the invention is to provide a reinforced platform of the character herein described with means enabling the elevating truck to be introduced beneath the end or side of the platform.

Another object of the invention is to provide an all-welded integral frame so constructed that adjacent parts of the metal frame are more firmly and securely welded together than in previous constructions, thereby to increase the rigidity of the platform.

These and other objects and features of the invention will more fully appear from the following description and the accompanying drawings and will be particularly pointed out in the claims.

A preferred embodiment of the invention is illustrated in the accompanying drawings, in which, Fig. 1 is a plan view of a platform broken away centrally to indicate that it may be of any desirable length;

Fig. 2 is a side elevation of the construction shown in Fig. 1;

Fig. 3 is a detail view of one of the end or corner portions of the platform;

Fig. 4 is a detail side elevation of the corner portion partly in section to illustrate clearly the construction of the side frame, end girders and legs in the manner in which they are welded together;

Fig. 5 is a plan view of the end portion of a plate from which the side frames are formed showing in broken longitudinally extending lines the fold lines along which the sheet is folded successively to form the upper and lower channels of the side frames and the webs extending downwardly from the end portion of the lower channel;

Figs. 6, 7, 8, and 9, are views illustrating the successive folding operations of the sheet illustrated in Fig. 5 to form the the side frames;

Fig. 10 is a plan view of the sheet for forming an end girder showing in broken lines the longitudinally extending fold lines of the sheet;

Fig. 11 is a vertical sectional view of a central portion of an end girder;

Fig. 12 is a detail perspective view of one of the end portions of the end girder; and, Fig. 13 is a plan view of one of the corner portions of the platform showing the three-way weld connecting together the end of the side frame, the end girder, and the upper end of the outer member of the leg and partly broken away to show also means for holding the end board in place.

The present invention comprises an improvement in the commercial type of industrial platforms illustrated and described in Patents No. 1,748,779, granted February 25, 1930, to Arthur L. Lewis and Frederick J. Shepard, Jr., No. 1,782,146, granted November 18, 1930, to Arthur L. Lewis, and No. 2,109,784, granted March 1, 1938, to Frederick J. Shepard, Jr., and Nathaniel Warshaw, in which the side frames are fabricated mainly from overlapped angle bars which are welded together in various manners to form channels to receive the ends of the floor boards and to provide reinforcing bolsters to increase the rigidity of the side frames.

The present invention differs from those disclosed in the aforesaid patents in that the complementary side frames are so constructed as to provide upper and lower longitudinally extending channels both formed from a reversely folded single sheet of metal. It also differs from the constructions disclosed in the patents aforesaid in the construction of the end girders and legs and in the manner in which they are welded together and to the side frames to provide a more rigid and economical construction, and in which the side frames and also the legs can be made of lighter material than heretofore without sacrificing the strength and rigidity of the platform.

A preferred form of platform embodying the invention which is illustrated in assembled position in Figs. 1 and 2 comprises complementary side frames 1 and 2, each of which has an upper channel 3 facing inwardly to receive the ends of floorboards or other suitable floor members 4, and a lower reinforcing channel 5 facing outwardly which serve as a bolster to reinforce the upper channel. As illustrated in Figs. 3 and 4 the upper channel has an upper horizontal flange 6, a vertical web 7, and a lower member or flange 8 which also constitutes the upper flange of the lower channel. The web 9 of the lower channel extends vertically downwardly in a vertical plane slightly beyond the inner edge of the flange of the upper channel to form a wide base to support the ends of the floorboards and has a lower flange 10 which is parallel to the flanges of the upper channel. The lower flange 10 of the lower channel terminates at a selected predetermined distance from the end of the side frames and the remaining portions of the web 9 of the lower channel provides a downward extension 11 lying in the same plane as the web 9 of the lower channel with the end 12 of said web flush with the end of the side frame for purposes which will hereinafter more fully appear.

The manner in which the side frames are formed from a flat plate of sheet metal is illustrated in Figs. 5 to 9 inclusive. Fig. 5 shows a flat plate 13 and illustrates in dotted lines the fold lines upon which the plate is successively bent to provide reverse channels extending mainly throughout the length of the side frames except for the downwardly extending web portion thereof.

In constructing the side frame the plate 13 is first bent upon the fold line 14 to provide a horizontal member 15 and a vertical member 16 as illustrated in Fig. 6. The end portion of the member 15 is then bent upwardly upon the line 17 at right angles to form the upper flange 6 of the upper channel, as illustrated in Fig. 7. The intermediate portion of the member 15 is then bent midway of its width on the line 18 to form the vertical web 7 of the upper channel and to position the upper flange 6 thereof in parallelism with the horizontal member 8 which forms the lower flange of the upper channel. The downwardly extending member 16 is provided with notches 19 extending inwardly from the edge thereof at equal predetermined distances from the ends of the plate 13 and the portion of the member 16 between the notches is bent outwardly at right angles to form the web 9 and lower flange 10 of the lower channel while the remaining portions of the member 16 of the plate between the notches and the ends of the plate form the downwardly extending webs 11 shown in Figs. 3 and 4.

By reason of this construction the side frames are of angularly S-shaped cross section throughout their length except for the downwardly extending web portions 11, thereby providing a structural form of great rigidity which compares favorably with that of an I-beam of similar dimensions.

The manner of constructing the end girders from a flat plate is illustrated in Fig. 10 which shows one of the duplicate end portions of the flat plate 20 as provided with parallel fold lines 21 and 22 which when the plate is folded thereon provides a channel bar having an upper flange 23 and a lower flange 24 united by a web 25. A portion of each end of the plate 20 which forms the upper flange 23 is cut away to provide recesses to receive the end of the upper horizontal flange of the upper side frame channel.

The lower flange portion of the plate 20 is cut away at each end as illustrated in Figs. 10 and 12 to provide extensions 26 adapted partially to overlie the vertical webs 7 of the upper channels when the ends of the girder are inserted in the channels 1 and 2 of the side frame thereby providing a space for a three-way weld uniting together the upper end of the outer member of the leg, the web of the end girder and the flanges and web of the upper channel of the side frame, as shown in Figs. 1 and 13.

One of the important features of the invention is to provide a leg construction which in welded assemblage upon the side frames will permit the use of lighter material than has heretofore been employed without loss of strength or rigidity.

In the construction disclosed in Patent 1,748,779 the ends of the lower horizontal flange of the channel are cut somewhat short of the end of the channel to leave a space to receive welding material for uniting the outer member of the leg to the end of the channel.

In Patent 2,109,784 a leg is employed which is wider than the webs of the channel and is welded to the end of the channel and to the lower horizontal flange of the end girder. In the present construction legs of lighter material equal in width to the width of the upper channel are provided and secured by three-way welds as aforesaid to the respective ends of the side frames and girders and also by welding to the downwardly extending web portions 11 of the side frames and the horizontal lower flange of the lower channel in such manner as to secure equal or greater strength of rigidity than the constructions disclosed in the patents aforesaid.

The preferred form of leg which is illustrated in Figs. 2, 3, and 4, is of general U-shape having an outer member 27, a substantially horizontal foot portion 28, and an inner rearwardly inclined member 29. The upper end of the outer member 27 of the leg overlaps the end portion of the web of the transverse girder and extends downwardly and inwardly therefrom at a slight angle so that a median portion 30 thereof overlaps and engages the downwardly extending web portion 11 of the lower channel.

By reason of the fact that the extensions 26 of the end girders partially overlap the vertical webs of the upper channels of the side frame each outer inwardly inclined leg member 27 will engage the lower edge of the end girder and the upper end of the leg will be so spaced from the end of the upper flange of the upper channel as to provide a substantially U-shaped horizontal recess adapted to receive three-way welding 31 integrally connecting together the upper end of the leg, the upper flange of the upper channel and the upper portion of the end girder. As each extension 26 of the end girder only partially overlaps the vertical web of the upper channel a vertical U-shaped recess exists between its end and the vertical web of the upper channel and the inside of the leg adapted to receive a vertical continuation of the three-way weld 31, thus integrally connecting these parts together. Similarly a lower horizontal U-shaped recess exists between the inner face of each leg, the lower edge of the transverse girder and the end of the lower flange of the upper channel of the side frame adapted to receive three-way welding also integrally connecting these parts together. Therefore three three-way welds integrally join each of the legs, end girders and side frames together as shown in Figs. 3, 4, and 13.

The median portion of the leg is secured by welding 32 to the downwardly extending web 11 of the side frame.

The inner member 29 of the leg also engages the web 11 and is welded to it and to the horizontal lower flange of the lower channel, as shown in Fig. 4. By reason of this construction the leg is so securely secured and trussed to the side frame by the extension 11 that the leg as well as the side frame can be made of lighter material than heretofore employed.

Another advantageous feature of the present construction resides in the inclination of the outer member 27 of the leg to the plane of the platform which is such that when the platform is stood on end and rests upon the members 27 at one end of the platform the vertical plane of the center of gravity of the platform will intersect inclined outer leg members at positions approximately midway of their length so that the platform will be safely balanced in inclined upright position, thereby enabling the platform to occupy a minimum amount of floor space when not in use and permitting several of them to be stacked one against or in proximity to the other, so that several will occupy less space than that required by the platform when standing horizontally upon its feet.

A further advantage is obtained in that the welding of the leg to the side frames and end girders can be conveniently performed from the outside of the respective side frames thereby further economizing time and labor required in welding.

By reason of this integral S-shaped side frame an all-welded leg construction of maximum rigidity is obtained which enables lighter material to be employed both for the side frame and legs than in previous constructions.

A further object of the invention is to provide means by which a platform having S-shaped side frames is so constructed that the elevating truck can be introduced beneath it from either end or from either side.

In platforms having wooden floors random widths of boards are frequently employed and there is always the likelihood of lateral shrinking of the boards which will cause them to separate. If the end floor boards recede from engagement with the end girders the impact of the elevating truck or other transporting means with the end girders is likely to bend or otherwise injure them. Another object of the invention is to provide means to retain the end floor boards firmly in place irrespective of the width thereof. This is accomplished in the present invention by providing clips or stop plates having flanges which engage the inner edge portion of the end floor board or a complementary recess therein and when the end floorboard is firmly seated within and against the end girder welding the clip or stop plate to the web of the upper channel. As illustrated in Fig. 13 the clip or stop plate is L-shaped having a section 33 slidably mounted within the upper channel in contact with the web thereof and a flange 34 extending at right angles thereto which engages the inner edge of the floorboard or a recess therein as illustrated in Fig. 13. When the board is forced into place the section 33 thereof is plug-welded to the web of the side frame through a suitable hole or holes 35 punched in the web 7 for this purpose. By reason of this construction the end boards of the platform reinforce the transverse girders and prevent deformation or injury thereof.

By reason of the fact that the webs 9 and extensions 11 of the lower channels of the side frame extend vertically downwardly throughout the length of the side frame they form smooth continuous guides in a "two-way" platform for directing the elevating truck if it is introduced beneath either end of the platform at an angle to the longitudinal axis of the platform.

Inasmuch as some industrial platforms are of "two-way" type and whereas others of a "four-way" type may be needed to permit introduction of the lifting mechanism beneath them either from the end or from the side of the platform, the present construction may be provided with means for accomplishing this purpose. As illustrated herein suitably spaced girders 36, preferably channel-shape, extend transversely across the platform beneath the upper channel and are welded at their ends to the webs 9 of the lower channels of the side frame. Desirably such girders are located adjacent to the upper ends of the inner leg members and if desired one or more similar intermediate cross girders may be added.

By reason of this construction an elevating truck may be introduced lengthwise of the platform and when the load supporting means is raised will engage the horizontal girders 36 and thereby lift the platform.

If the elevating truck is introduced beneath the sides of the platform the load supporting means when raised will engage the lower flanges 10 of the side frames and raise the platform.

It will therefore be apparent that a platform having integral S-shaped side frames normally of the "two-way" type can be readily converted into a "four-way" type when the latter is required.

It will be understood that while in the preferred embodiment of the invention the side frames are made of integral sheets of steel formed and fabricated in the manner above described they can be fabricated from structural channels and/or angle bars to produce side frames of the S-shaped construction herein described.

It will also be understood that the side frames and legs may be made of plates of other weldable material such as alloys of aluminum or magnesium or from plastic material of suitable strength which may be adapted to be folded in the manner above described or made by extrusion processes.

It will therefore be understood that the embodiment of the invention shown and described herein is of an illustrative character and not restrictive of the meaning and scope of the following claims.

Having thus described the invention, what is claimed as new and desired to be secured by Letters Patent is:

1. A portable platform having unitary side frames comprising rigid side girders each having an upper horizontal channel extending throughout its length and a reversely arranged lower horizontal channel having its lower flange terminating short of the respective ends of said side girders and the vertical web of the remaining end portions of said lower channel extending downwardly below the lower horizontal flange thereof, end girders welded to and connecting the respective ends of said side girders, legs welded to the ends of the respective side girders and end girders and to the downwardly extending vertical webs of the side girders, and floor members seated at their ends in complementary channels of the side girders.

2. A portable platform having unitary side frames comprising complementary integral girders each mainly of angular S-shaped cross section having parallel horizontal flanges of substantially equal width providing an upper inwardly facing horizontal channel extending throughout its length, and a reversely arranged lower horizontal channel having its lower flange terminating short of the respective ends of the side girder, and the vertical web of the remaining portions of the lower horizontal channel extending downwardly below the lower flange thereof, channel-shaped end girders having their ends extending into the ends of the upper channels of the side girders and welded thereto, U-shaped legs each having an inwardly inclined outer member overlying the end of the side girder and welded thereto and to the end girder and to said downwardly extending web portions of the lower channel, and an innner member welded to said downwardly extending web and to the horizontal members of said lower channel and floorboards having their ends fitting and extending into the upper channels of said side girders.

3. A portable platform having complementary one-piece rigid side frames each comprising an integral sheet of metal formed to provide a longitudinal inwardly facing upper channel extending throughout the length of the side frame an outwardly facing lower horizontal channel having the lower flange thereof terminating a predetermined distance short of the respective ends of said side girders with the vertical webs of the remaining portions of the lower channel extending vertically downwardly below the lower flange of the lower channel, end girders extending into and welded to the upper channels of the side girders and having extensions of the web thereof overlying the vertical webs of the upper channels, U-shaped legs having the upper end portions of their outer members overlying and welded to the ends of the side girders and to the end girders and to the extensions thereof which overlie the vertical web of the upper channel, said outer leg members being slightly inclined inwardly and welded to said downwardly extending webs and their inner members welded to said web and also to the horizontal lower flange of the lower channel, and floor-boards having their ends fitting the upper channels of said side girders.

4. A portable platform having complementary one-piece rigid side frames each comprising an integral sheet of metal formed to provide a longitudinal inwardly facing upper channel extending throughout the length of the side frame and a lower horizontal channel having the lower flange thereof terminating a predetermined distance short of the respective ends of said side girders with the vertical webs of the remaining portion of the lower channel extending downwardly, end channel bar girders extending into the upper channels of the side girders and welded to the flanges thereof and having extensions overlying the vertical webs of the upper channels with the upper flanges of said end girders flush with the upper flanges of the upper channels, the end portions of the upper flanges of said end girders being cut away to receive the upper flanges of the upper channel, U-shaped legs having the upper end portions of their outer members overlying and welded to the ends of the side girders and to the end girders and the extensions thereof and slightly inclined inwardly and welded to said downwardly extending webs and having the inner members of said legs welded to said web and to the web and horizontal members of the lower channel and floor boards having their ends fitting the upper channels of said side girders.

5. A portable platform having an all-steel unitary frame comprising side frames each formed from an integral sheet of metal to provide upper and lower reversely arranged longitudinally extending channels, the upper flange of the upper channel and the lower flange of the lower channel terminating short of the respective ends of the side frames and the remaining portion of the vertical web of the lower channel extending downwardly beyond the lower flange of the lower channel, structural steel end girders having their lower flanges extending into and resting upon the lower flanges of the upper channel and end extensions of their upper flanges overlying the vertical webs of said upper channels in the plane of the upper flanges thereof, U-shaped legs having the upper ends of their outer members overlying the respective ends of the end girders and inclined slightly downwardly and inwardly therefrom and welded to the end portions of the side frames and end girders and to the downwardly extending webs with the inner members of said legs welded to said webs and to the horizontal members of the lower channel, and floorboards having their ends seated in and fitting the complementary upper channels.

6. A portable platform having unitary side frames comprising complementary metal side girders having channels to receive the ends of the floorboards with holes in the webs of said channels adjacent to the end floorboards, metal end girders welded to the respective ends of the side frames, and vertical L-shaped end-board retaining plates slidably mounted in the respective channels having vertical sections contacting with the webs of the channels and sections extending at right angles thereto engaging the inner edge portions of the respective end floorboards irrespective of the width thereof, plug welds in said holes uniting said retaining plates to said channels thereby preventing displacement of the end floorboards, and legs having members welded to the respective ends of the side frames.

7. A portable platform having complementary metal side frames mainly of angular S-shaped cross section providing inwardly facing upper channels extending throughout the length thereof to receive the ends of floorboards and outwardly facing lower horizontal reinforcing channels having their lower flanges terminating short of the ends of the side frames with the remaining vertical web of the lower channel extending downwardly below the lower flange thereof, floorboards having their ends seated in said upper channels and end girders respectively extending into said upper channels, U-shaped legs having the upper ends of their outer members overlying the ends of the upper channels and connected to said side frame and girder by three-way welding and extending downwardly and inwardly therefrom at such angle relatively thereto that the vertical plane of the center of gravity of the platform will intersect the inwardly inclined outer leg member approximately midway of the length thereof to retain the platform in inclined upright position when stood on end and welding connecting the inner leg members to the vertical web extending downwardly from the lower channel.

RUSSELL HASTINGS, Jr.

REFERENCES CITED

The following references are of record in the file of this patent:

UNITED STATES PATENTS

| Number | Name | Date |
| --- | --- | --- |
| 1,618,257 | Young | Feb. 22, 1927 |
| 1,782,146 | Lewis | Nov. 18, 1930 |
| 1,963,416 | Minshall | June 19, 1934 |
| 1,993,237 | Barrett | Mar. 5, 1935 |
| 2,109,784 | Shepard et al. | Mar. 1, 1938 |